United States Patent
Lau et al.

(10) Patent No.: US 9,672,244 B2
(45) Date of Patent: Jun. 6, 2017

(54) EFFICIENT UNDO-PROCESSING DURING DATA REDISTRIBUTION

(75) Inventors: Leo Tat Man Lau, Ontario (CA); Adil Mohammad Sardar, Ontario (CA); Philip Shawn Cox, Ontario (CA); David Tremaine, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 1353 days.

(21) Appl. No.: 12/274,741

(22) Filed: Nov. 20, 2008

(65) Prior Publication Data

US 2010/0125555 A1    May 20, 2010

(51) Int. Cl.
*G06F 17/30* (2006.01)

(52) U.S. Cl.
CPC .. *G06F 17/30377* (2013.01); *G06F 17/30339* (2013.01); *G06F 17/30575* (2013.01)

(58) Field of Classification Search
CPC ......... G06F 17/30575; G06F 17/30377; G06F 17/30339; G06F 17/30584
USPC ............................................... 707/999.2, 684
See application file for complete search history.

(56) References Cited

U.S. PATENT DOCUMENTS

| | | | |
|---|---|---|---|
| 4,945,474 A * | 7/1990 | Elliott et al. | 714/16 |
| 5,437,026 A | 7/1995 | Borman et al. | |
| 5,692,174 A | 11/1997 | Bireley et al. | |
| 5,692,182 A | 11/1997 | Desai et al. | |
| 5,892,945 A | 4/1999 | Mirchandaney et al. | |
| 5,909,540 A | 6/1999 | Carter et al. | |
| 5,991,772 A | 11/1999 | Doherty et al. | |
| 6,374,264 B1 * | 4/2002 | Bohannon et al. | |
| 6,453,383 B1 * | 9/2002 | Stoddard et al. | 711/112 |
| 6,505,227 B1 | 1/2003 | Mirchandaney et al. | |
| 6,959,401 B2 * | 10/2005 | Lomet et al. | 714/16 |
| 7,107,270 B2 | 9/2006 | Putzolu | |
| 7,272,646 B2 * | 9/2007 | Cooper et al. | 709/223 |
| 2004/0030703 A1 * | 2/2004 | Bourbonnais et al. | 707/100 |
| 2004/0047354 A1 | 3/2004 | Slater et al. | |
| 2004/0215640 A1 * | 10/2004 | Bamford et al. | 707/100 |

(Continued)

OTHER PUBLICATIONS

Cohen et al., "Messages Scheduling for Parallel Data Redistribution Between Clusters", Aug. 24, 2006, IEEE.*

(Continued)

*Primary Examiner* — Apu Mofiz
*Assistant Examiner* — Sheryl Holland
(74) *Attorney, Agent, or Firm* — Janaki K. Davda; Konrad, Raynes, Davda & Victor LLP

(57) ABSTRACT

A method and system for facilitating an undo operation. In one embodiment, the method includes generating a plurality of control files, where each of the control files is associated with a batch of data that is received from a sending partition during a redistribution process, and where each control file includes a list of pages and corresponding ranges of rows of data that have been appended to the pages. The method also includes writing the control files to a persistent memory for each control file where all of the associated rows of the respective consistency point have been appended to pages and written to a persistent memory. The method also includes, in response to an interruption in the redistribution process, identifying pages and rows to be deleted during an undo operation based on the plurality of control files.

15 Claims, 5 Drawing Sheets

(56) References Cited

U.S. PATENT DOCUMENTS

| | | |
|---|---|---|
| 2004/0255182 A1* | 12/2004 | Lomet et al. ............... 714/2 |
| 2005/0086195 A1* | 4/2005 | Tan et al. ............... 707/1 |
| 2006/0075308 A1* | 4/2006 | Haselden et al. ............... 714/39 |
| 2006/0155938 A1 | 7/2006 | Cummings et al. |
| 2006/0190243 A1 | 8/2006 | Barkai et al. |
| 2006/0294312 A1 | 12/2006 | Walmsley |
| 2007/0162506 A1* | 7/2007 | Grosman et al. ........ 707/104.1 |
| 2009/0063807 A1* | 3/2009 | Cox et al. ............... 711/173 |

OTHER PUBLICATIONS

"Redistributing data across database partitions using the Redistribute Database Partition Group command", Aug. 11, 2014, DB2 Version 9.5 for Linux, UNIX and Windows, IBM.*

Cox et al., Data Redistribution in Shared Nothing Architecture, International Business Machines Corporation, U.S. Appl. No. 11/847,270, filed Apr. 30, 2007.

A Quick Reference for Tuning DB2 Universal Database EEE; Parlapalli, Surendra; IBM May 23, 2002.

An Efficient Method for Supporting Cached Results Sets within a Relational Database; IBM Technical Disclosure Bulletin, NNRD455172; IBM; Mar. 2002.

Serialization Locks in a Share-Nothing Multiple Node RDBMS; IBM Technical Disclosure Bulletin, NNRD41786; Jan. 1999.

On-Line Data Redistribution in a Shared-Nothing Parallel Database System; IBM Technical Disclosure Bulletin, NN9701157; IBM; Jan. 1997.

IBM, An Efficient Method for Supporting Cached Result Sets within a Relational Database; IBM Technical Disclosure Bulletin, NNRD455172; IBM; Mar. 2002, Total 5 pp.

IBM, "On-Line Data Redistribution in a Shared-Nothing Parallel Database System", IBM Technical Disclosure Bulletin, NN9701157; IBM; Jan. 1997, Total 6 pp.

IBM, "Serialization Locks in a Share-Nothing Multiple Node RDBMS", IBM Technical Disclosure Bulletin, NNRD41786; Jan. 1999, Total 6 pp.

Parlapalli, Surendra, "A Quick Reference for Tuning DB2 Universal Database EEE", IBM; May 23, 2002, Total 18 pp.

Office Action 1, Dec. 30, 2009, for U.S. Appl. No. 11/847,270, filed Aug. 29, 2007 by P.S. Cox, Total 24 pp. [U.S. Appl. No. 11/847,270 (OA1)].

* cited by examiner

EFFICIENT UNDO-PROCESSING DURING DATA REDISTRIBUTION

CROSS-REFERENCE TO RELATED APPLICATIONS

The present invention is related to a co-pending U.S. application Ser. No. 11/847,270, filed on Aug. 30, 2007, and entitled "Data Redistribution in Shared Nothing Architecture," and is herein incorporated by reference.

FIELD OF THE INVENTION

The present invention relates to computer systems, and more particularly to a method and system for facilitating an undo operation.

BACKGROUND OF THE INVENTION

In data warehouse growth scenarios involving the addition of new database partitions to an existing database, it is necessary to redistribute the data in the database to achieve an even balance of data among all the database partitions (i.e., both existing partitions and newly added partitions). Such redistribution scenarios typically involve movement of a significant amount of data, and require down time while the system is off line.

Relational tables are typically distributed over one or more of the database partitions, and each partition resides on one physical machine in a cluster of physical machines. The location of rows of data in a given database table partitioned in this way is determined by a distribution function that maps row data to a database partition number. In such a database system, it may occasionally be desirable, or even necessary, to modify this distribution function. One common reason for doing so is that the current database manager capacity is inconsistent with current or future business requirements and so physical machines need to be added or removed from the database cluster. Another common reason is that the existing distribution of data across database partitions becomes non-uniform or inconsistent with the processing power of the physical machines on which database partitions reside. Whenever the data distribution function is modified, it is necessary to redistribute existing table data among the database partitions according to the new distribution function. Performance and usability are critical aspects of any data redistribution operation since prolonged down time of the database is typically not acceptable.

When database manager capacity does not meet present or projected future needs, a business can expand its capacity by adding more physical machines. Adding more physical machines can increase both data-storage space and processing power by adding separate single-processor or multiple-processor physical machines. The memory and storage system resources on each machine are typically not shared with the other machines. Although adding machines might result in communication and task-coordination issues, this choice provides the advantage of balancing data and user access across more than one system in shared-nothing architecture. When new machines are added to a shared-nothing architecture, existing data needs to be redistributed. This operation is called data redistribution. This data redistribution operation is far more common in data warehouse customers as the amount of data accumulates over time. In addition, as business mergers and acquisitions become more popular, the need for more capacity also increases.

One problem with redistribution operations is that when an interrupted redistribution operation is continued, each receiving partition needs to perform a process of physically "undoing" the redistribution work that was partially completed at the time of the failure. This can be time consuming and may require a substantial amount of system resources, which can impact performance.

Accordingly, what is needed is an improved method and system for improving undo operations after an interruption of a data redistribution process. The present invention addresses such a need.

SUMMARY OF THE INVENTION

A method and system for facilitating an undo operation are disclosed. In one embodiment, the method includes generating a plurality of control files, where each of the control files is associated with a batch of data that is received from a sending partition during a redistribution process, and where each control file includes a list of pages and corresponding ranges of rows of data that have been appended to the pages. The method also includes writing the control files to a persistent memory for each control file where all of the associated rows of the respective consistency point have been appended to pages and written to a persistent memory. The method also includes, in response to an interruption in the redistribution process, identifying pages and rows to be deleted during an undo operation based on the plurality of control files. According to the system and method disclosed herein, writing of control files to persistent memory at run time is minimized.

DETAILED DESCRIPTION OF THE INVENTION

The present invention relates to computer systems, and more particularly to a method and system for facilitating an undo operation. The following description is presented to enable one of ordinary skill in the art to make and use the invention, and is provided in the context of a patent application and its requirements. Various modifications to the preferred embodiment and the generic principles and features described herein will be readily apparent to those skilled in the art. Thus, the present invention is not intended to be limited to the embodiments shown, but is to be accorded the widest scope consistent with the principles and features described herein.

A method and system in accordance with the present invention for facilitating an undo operation are disclosed. In one embodiment, the method includes generating one or more control files for batches of data being received from a sending partition during a redistribution operation. Each control file is associated with a batch of data referred to as a consistency point, and each control file includes a list of pages and corresponding ranges of rows of data that have been appended to the pages. The method also includes writing the control files to a persistent memory for each control file, where all of the associated rows of the respective consistency point have been appended to pages and written to a persistent memory. In response to an interruption in the redistribution process, the method further includes identifying pages and rows to be deleted during an undo operation based on the plurality of control files. According to the system and method disclosed herein, writing of control files to persistent memory at run time is minimized. To more particularly describe the features of the present invention, refer now to the following description in conjunction with the accompanying figures.

Figure 1:
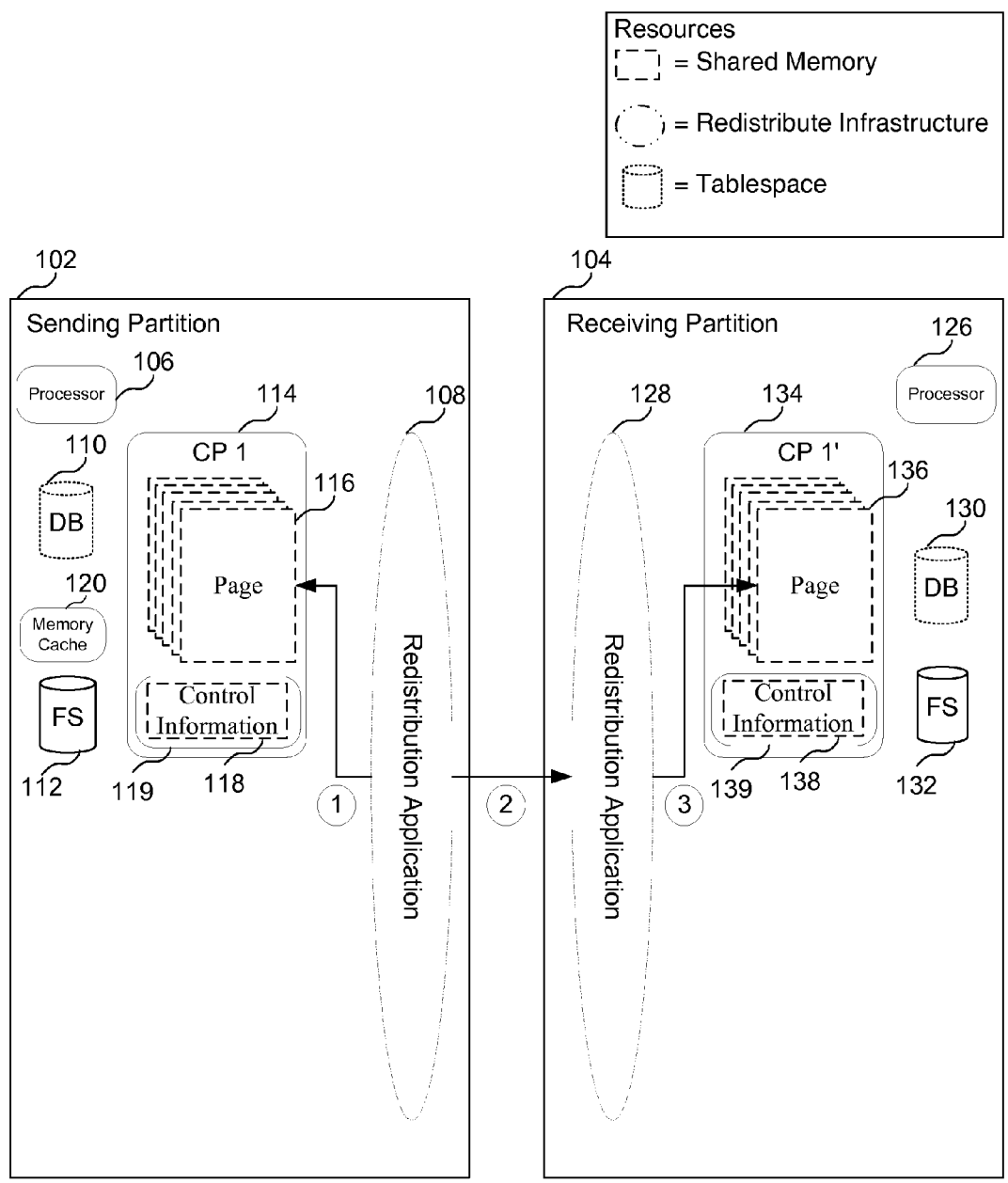
FIG. 1 is a block diagram of a redistribution system in accordance with one embodiment of the present invention.

FIG. 1 is a block diagram of a redistribution system 100 in accordance with one embodiment of the present invention. FIG. 1 shows a sending system or sending partition 102 and a receiving system or receiving partition 104. The sending partition 102 includes a processor 106, a redistribution application 108 that is executed by the processor 106 and stored in a memory. The sending partition 102 also includes a database management hard disk 110, a file system hard disk 112, consistency points 114, pages 116, control information 118 stored in a control file 119, and a memory cache 120. Similarly, the receiving partition 104 includes a processor 126, a redistribution application 128 that is executed by the processor 126 and stored in a memory. While the database management hard disk 110 and a file system hard disk 112 are shown as two separate hard disks, it is possible, in alternative embodiments, for the database management hard disk 110, a file system hard disk 112, to be a part of the same hard disk or persistent memory.

The receiving partition also includes a database management hard disk 130, a file system hard disk 132, one or more consistency points 134, pages 136, and control information 138 stored in a control file 139. While the database management hard disk 130 and a file system hard disk 132 are shown as two separate hard disks, it is possible, in alternative embodiments, for the database management hard disk 130, a file system hard disk 132, to be a part of the same hard disk or persistent memory. For ease of illustration, only one consistency point 114 is shown at the sending partition 102, and only one consistency point 134 is shown at the receiving partition 104. Embodiments may have multiple consistency points at a given partition. In other words, in particular embodiments, the consistency point 114 may represent multiple consistency points. In operation, the redistribution applications 108 and 128 are operable to divide data into multiple consistency points 114 and 134, as described below.

Figure 2:
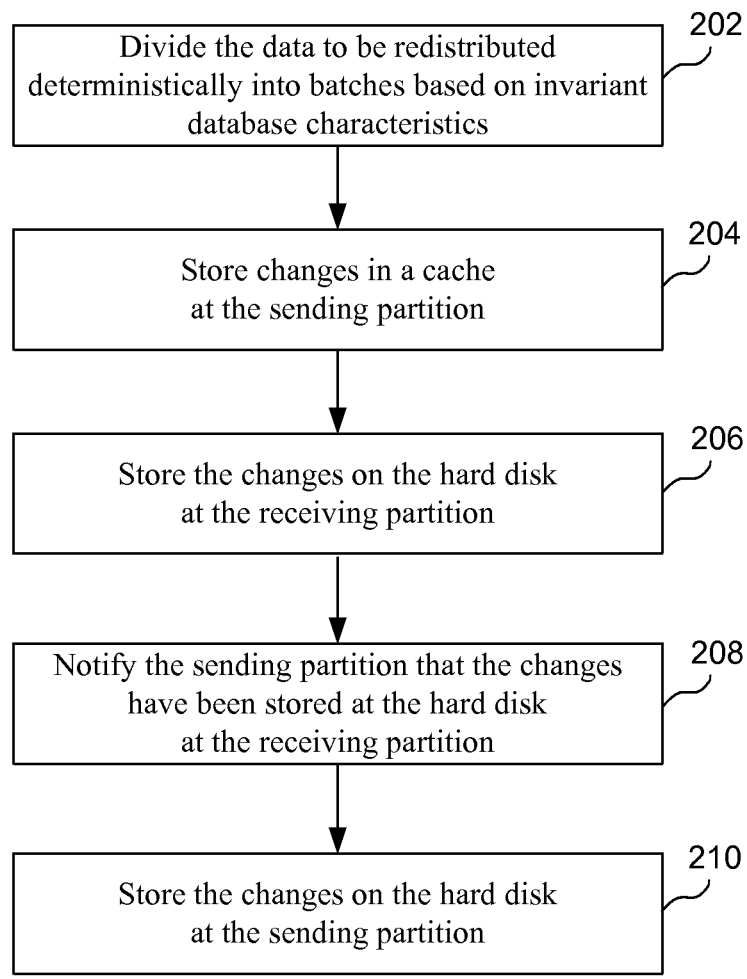
FIG. 2 is a flow chart showing a method for redistributing data in accordance with one embodiment of the present invention.

FIG. 2 is a flow chart showing a method for redistributing data in accordance with one embodiment of the present invention. Referring to both FIGS. 1 and 2, in step 202, at the sending partition 102, the redistribution application 108 divides the data that is to be redistributed deterministically into batches, also referred to as consistency points 114, based on invariant database characteristics. The data is divided deterministically into batches, because redo operations may require the same batch size and pages. In particular implementations, the database structure may imply the type of table. In one implementation, the redistribution application 108 may select different batch sizes based on how the table which stored the data was created.

In one embodiment, a consistency point is a batch of rows that the sending partition 102 sends to one or more receiving partitions 104 during a redistribution process. A consistency point may also be defined as a data structure that ties together a series of changes in memory (e.g., pages 116) and corresponding logical structure changes (e.g., control information 118). In one embodiment, there is one control file 139 maintained on the receiving database partition 128 for each of the active consistency points 134, where each active consistency point 134 corresponds to a stream of data being sent by a particular sending partition such as sending partition 102. The consistency point 114 shown in FIG. 1 may represent the very first consistency point and includes modified or "dirty" pages 116 and corresponding control information 118.

As the redistribution application 108 works on the table data stored on the database management hard disk 110, the redistribution application 108 populates the consistency point 114 with the pages and control information (numbered circle 1). The pages 116 are populated in that the redistribution application 108 appends rows of the data to the pages 116. In one embodiment, while data is being redistributed, multiple consistency points 114 may exist at any given time. As such, the consistency point 114 of FIG. 1 may represent other consistency points. Also, in one embodiment, the redistribution application 108 may store each consistency point 114 in separate consistency point files.

In step 204, for each consistency point, the redistribution application 108 stores the changes (e.g., pages 116) on the sending machine in the memory cache 120 at the sending partition 102. In one embodiment, the redistribution application does not store the pages (i.e., changes) to the database management hard disk 110 until after the redistribution application 128 at the receiving partition 104 has successfully stored all its changes (e.g., pages 136) for consistency point 134 to a database management hard disk 130.

The redistribution application 108 sends the changes over the network to the receiving partition 104 (numbered circle 2), and the redistribution application 128 populates the consistency point 134 with pages 136 which include the changes, and with control information 128 (numbered circle 3). The pages 136 are populated in that the redistribution application 128 appends rows of the data to the pages 136. This process continues until the redistribution application 108 at the sending partition 102 determines that enough data has been processed for the consistency point. Once enough data has been processed, in step 206, the redistribution application 128 at the receiving partition 104 initiates a procedure to commit or store the changes to the database management hard disk 130. In one embodiment, control information 128 is first written to the file system hard disk 132. This ensures that the control information has been written for the undo operation in the event of a failure. Particular embodiments for an undo operation are described in detail below in connection with FIG. 4. In a specific embodiment, once the control information has been written out, there is no need for caching at the receiver partition 104. As such, the redistribution application 108 may immediately begin flushing or writing the changed pages to the database management hard disk 130. In one embodiment, before the sending partition 102 sends data, the sending partition needs to update the control information 118, and ensure that the control information 118 is flushed or written to file system hard disk 112.

In step 206, redistribution application 128 at the receiving partition 104 stores the changes on database management hard disk 130 at the receiving partition 104. In one embodiment, the receiving partition 104 may receive and process data from multiple consistency points (e.g., current consistency points being processed on different sending partitions)

in parallel so that the logging scheme is minimized and does not impede concurrency or performance. In the step 208, the redistribution application 128 at the receiving partition 104 notifies the redistribution application 108 at the sending partition 102 that the receiving partition 104 has successfully stored the changes on the database management hard disk 130 at the receiving partition 104. In step 210, in response to the notification, the redistribution application 108 stores the changes on the database management hard disk 110 via the memory cache 120 at the sending partition 102. The redistribution application 108 may then empty the memory cache 120.

In one embodiment, there is one control file per consistency point, and once the consistency point is complete (e.g., all of the changes to the data in the consistency point are written to the database management hard disk 110 at the sending partition 102 and to the database management hard disk 130 at the receiving partition 104), the corresponding control files with the control information 118 and 128 may be removed from the consistency point 114 so that the control information does not accumulate and thus freeing up memory space.

As described in more detail below, in one embodiment, the data redistribute operation is restartable in that if the redistribute operation fails due to a problem such as a resource error (e.g., not enough hard disk space, memory, log space, etc.), the redistribution application 108 may simply restart the data redistribution process where it left off without needing to restore the database from the beginning. For example, the redistribution application 108 may restart at the consistency point following the consistency point that was last successfully stored at the receiving partition 104. In one embodiment, for each data page being processed, the redistribution application 108 stores a relatively small amount of control information in the control file 119 at both the sending and receiving partitions 102 and 104 during run time. In one embodiment, the control information includes the page ID and the number of rows changed in each page. The page ID and the number of rows changed in each page provide a reference point that the redistribution application 108 may use to restart the data redistribution process where it left off before the failure. As such, there is no need to store user data from the control file. Storing only the control information in the control file minimizes the amount of information saved on both the sending and receiving partitions 102 and 104, while still being able to recover from an unplanned failure.

Figure 3:
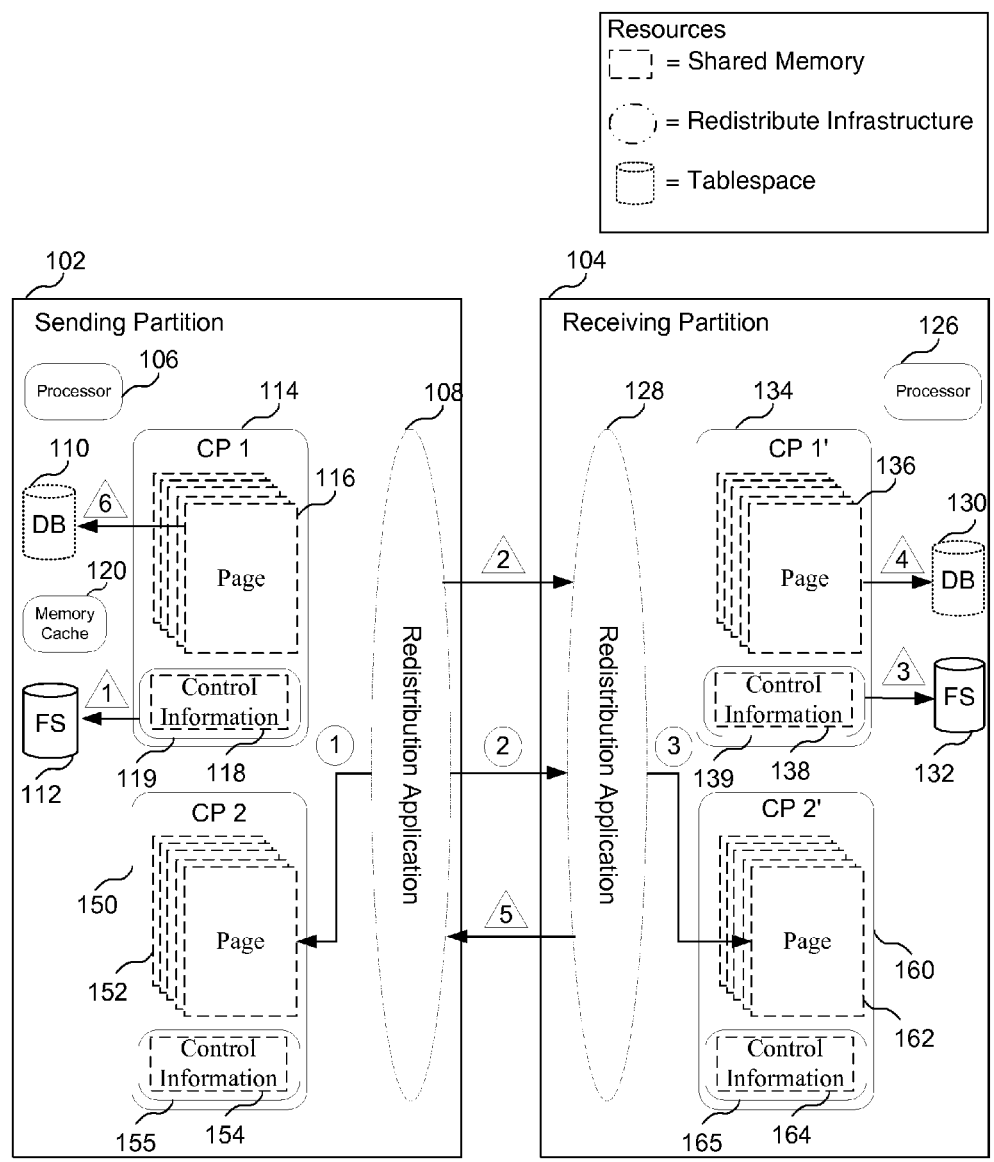
FIG. 3 is a block diagram of a redistribution system in accordance with one embodiment of the present invention.

FIG. 3 is a block diagram of a redistribution system 100 in accordance with one embodiment of the present invention. The redistribution system 100 of FIG. 3 is the same as that of FIG. 1, except that the redistribution system 100 of FIG. 3 includes second consistency points 150 and 160, pages 152 and 162, and control information 154 and 164 stored in respective control files 155 and 165. As FIG. 3 shows, in one embodiment, the redistribution application 108 simultaneously executes two sequences of events. As described in more detail below, the numbered triangles 1-6 indicate how a consistency point is committed (i.e. stored to hard disks). In one embodiment, the numbered circles 1-3 indicate the same sequence of events shown in FIG. 1 above.

When the consistency point 114 is being committed, the redistribution application 102 will continue to operate on the second consistency point 150. In one embodiment, when the redistribution application 108 first commits consistency point 114, the control information 118 is stored in a control file on the file system hard disk 112 via the memory cache 120 (numbered triangle 1). The redistribution application 108 then sends a message containing the changes over the network to the receiving partition 104 (numbered triangle 2). Upon receiving the message, the redistribution application 128 at the receiving partition 104 begins writing the control information 128 and then the pages 136 to the file system hard disk 132 at the receiving partition 104 (numbered triangle 3).

In one embodiment, the redistribution application 108 does not write pages 116 to the database management hard disk 110 at the sending partition for a particular consistency point until after the redistribution application 128 writes the corresponding control information 128 and pages 136 to the database management hard disk 130 at the receiving partition 104. As such, if an error occurs, the redistribution application 108 may reprocess that consistency point at the sending partition.

In one embodiment, after the redistribution application 128 at the receiving partition 104 writes the pages 136 to the file system hard disk 132 at the receiving partition 104, the redistribution application 128 writes the corresponding control information to the database management hard disk 130 (numbered triangle 4). The redistribution application 128 at the receiving partition 104 then sends back a notification to the redistribution application 108 at the sending partition 102 to indicate that the redistribution application 108 has successfully stored the changes on the database management hard disk 130 at the receiving partition 104 (numbered triangle 5). In response to the notification, the redistribution application 108 then writes its pages 116 the database management hard disk 110, which completes the processing of consistency point 114.

In one embodiment, Table 1 shows example content in a status table. On either the sending or receiving partitions 102 and 104, each consistency point may be in either a "Done" state or a "Not Done" state. The Table 1 shows the corresponding recovery actions for all combinations:

TABLE 1

| Sending Partition CP state | Receiving Partition CP state | Sending Partition Recovery Action | Receiving Partition Recovery Action |
|---|---|---|---|
| Not Done | Not Done | Redo CP | Undo CP |
| Not Done | Done | Redo CP | Nothing |
| Done | Not Done | Error | Error |
| Done | Done | Nothing | Nothing |

In one embodiment, after a failure, the redistribution applications 108 and 128 only need to perform a redo operation at the sending partition 102 and perform an undo operation the receiving partition 104 for any of the above-described processing steps associated with any batches of changes that were not successfully stored at the hard disk of the receiving partition 104 before the failure occurred. The information stored in the control file for each consistency point will then be used to redo the operations on the sending partition and undo the operations on the receiving partition.

The Embodiments described above avoid unnecessary logging during data redistribution by avoiding having to log the actual content of each row being moved thereby saving storage space. As such, the sending partition stores enough information to redo the consistency point in case of a failure. Also, the receiving partition stores enough information to undo the consistency point in case of a failure. The value of "minimal logging" is that it minimizes the log space requirement so that the system need not reserve inordinate amounts of log space for the operation, which results in fewer resources to manage for database administrators and results in a lower chance of failure during the redistribute operation itself. At the same time, minimal logging allows for the redistribution operation to be restartable. Minimal logging also helps to increase performance because fewer system resources are consumed by logging operations.

Undo Operations

In one embodiment, when an interrupted redistribution operation is continued (or aborted) using the minimal logging infrastructure described above, the redistribution application 128 of the receiving partition 104 performs a process of physically deleting or "undoing" the work of all consistency points that were partially completed at the time of the failure. In one embodiment, a consistency point is partially completed if the all of the rows of data associated with the consistency point is not yet appended to pages or if the pages, even with all of the rows appended, have not yet been successfully written to the database management hard disk 130. The receiving partition 104 needs to perform an undo operation, because the physical placement of rows added during the consistency points on the receiving partition 104 is non-deterministic. Being non-deterministic means that when the consistency point is redone during a continuation operation, there is no guarantee that rows arriving from sending database partitions will end up in the same location on disk. Thus, all rows added in partially complete consistency points need to be deleted before a continuation operation is allowed to occur. On the sending partition 102, it is not necessary to undo partially completed consistency points, because partially completed consistency points on the sending partition 102 can be redone in a deterministic fashion in the continuation operation following an undo operation.

In one embodiment, in order for the redistribution application 128 of the receiving partition 104 to reliably undo pages in partially complete consistency points, the redistribution application 128 may flush or write the control file entries for a given page to the file system hard disk 132 before flushing or writing the corresponding page to the database management hard disk 130. This approach is referred to as write-ahead logging. This also requires that the redistribution application 128 or other suitable mechanism synchronize between the database bufferpool and the control files to ensure the control file is flushed to disk before the corresponding page changes.

In one embodiment, to avoid having to initiate a synchronization process, the redistribution application 128 may flush the control file to disk after flushing each corresponding page change. The following embodiments facilitate the undo process, while reducing the frequency that control files are flushed to disk during run time.

Figure 4:
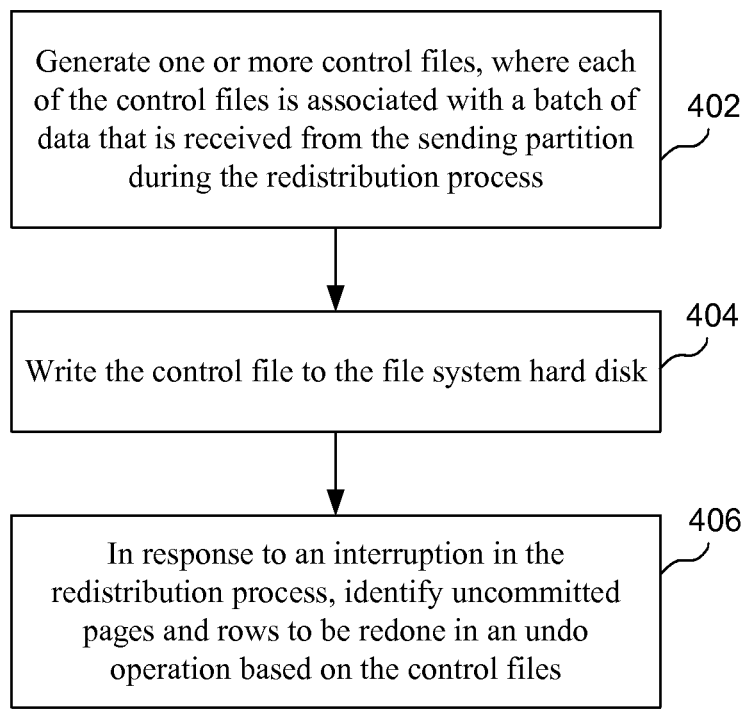
FIG. 4 is a flow chart showing a method for facilitating an undo operation in accordance with one embodiment of the present invention.

FIG. 4 is a flow chart showing a method for facilitating an undo operation in accordance with one embodiment of the present invention. Referring to both FIGS. 1 and 4, in step 402, the redistribution application 128 on the receiving partition 104 generates one or more control files, where each of the control files 139 is associated with a batch of data (e.g., consistency point 134) that is received from the sending partition 102 during the redistribution process. In one embodiment, each control file 139 includes a list of pages 136 and corresponding ranges of rows of data that have been appended to the pages 136 during the redistribution process.

More specifically, in one embodiment, when the redistribution application 128 receives, from the sending partition 102, a batch of data for a particular consistency point, the redistribution application 128 appends rows of the data to one or more pages 136. As indicated above, the redistribution application 128 generates one control file 139 for each consistency point 134. For each page 136 to which the receiving partition 104 writes data, the redistribution application 128 adds an entry to the list in the control file 139. In one embodiment, an entry includes a page number and a range of rows or slots, also referred to as page-slot range pairs. In a specific embodiment, an entry may have the following format , where the start slot is the first row and the end slot is last row appended to the page corresponding to the page number.

Each consistency point has one control file that includes one or more entries. It is possible for a single page to contain rows for multiple, different consistency points. As such, a given page may have one associated entry (e.g., ) for one consistency point and have another associated entry (e.g., ) for another consistency point. In one embodiment, it may be necessary to delete only one range of rows on a page and not the entire page in an undo operation. This is would be the case where certain rows of a page (e.g., rows 1-50) are already committed (e.g., written to disk) and certain rows of the same page (e.g., rows 51-100) are uncommitted (e.g., not yet written to disk).

In one embodiment, the redistribution application 128 initializes all of the pages to be empty when they are created. The redistribution application 128 then appends rows to each page in a contiguous fashion as the data is received from the sending partition 102. The redistribution application 128 also appends an entry to the control file 139 for every page 136 that the redistribution application 128 appends rows from the associated consistency point 134 to pages.

In one embodiment, when the sending partition 102 finishes sending data records for a given consistency point to the receiving partition 104, the sending partition 102 sends a special message to the redistribution application 128 of the receiving partition 104 indicating that there is no more data to be sent for the current consistency point. After the redistribution application 128 appends all of the rows associated with a given consistency point to the pages, the redistribution application 128 flushes or writes the pages to the database management hard disk 130. In one embodiment, when pages are flushed to disk, the pages are only appended to the database table. In one embodiment, the database table includes meta information that includes page numbers (e.g., pageCount) associated with the database table. In one embodiment, the meta information is not updated during the active redistribution process. Instead, in one embodiment, the meta information is updated at the end of the redistribution process. As the redistribution application 128 extends the table with more pages, the redistribution application 128 updates the raw size in bytes for the database table object.

In one embodiment, after the pages are also flushed to disk, the redistribution application 128 marks the control file as "complete." This is done for each control file as its associated pages and rows are flushed to disk. Any such control file marked "complete" thus identifies committed pages and rows that have been successfully flushed or written to the database management hard disk 130. In other words, the pages and corresponding rows in the list of a control file marked as complete are guaranteed to be on disk. These pages and rows are not to be removed during a subsequent undo operation.

Referring still to FIG. 4, in step 404, the redistribution application 128 flushes or writes the control file 139 to the file system hard disk 132. This is performed for each control file 139, where all of the associated rows of data of the respective consistency point have been appended to the pages 136 and written to the file system hard disk 132 or other suitable persistent memory.

The list of committed pages and rows for the control file is added to other lists of committed pages and rows in the file system hard disk 132. The redistribution application 128 can ascertain the consistency point to which particular committed pages and rows are associated, because their associated control file corresponds to a particular consistency point. Also, because there is one entry per page in a given list of pages and rows associated with a given control file, any two or more entries that include the same page are associated with different control files and thus different consistency points.

Note that up to this point, there is no write-ahead logging requirement for this undo process. In other words, there is no requirement that control file entries be flushed before their associated pages are flushed to disk. Also, there is no requirement that a given control file be flushed after each entry is appended to the control file. The only requirement, in this embodiment, is that the redistribution application 128 flushes or writes the control file 139 to the file system hard disk 132 after a given consistency point 134 completes.

In one embodiment, a consistency point is considered complete after appending all of the entries associated with the consistency point to the control file, and after all of the rows of the associated consistency point have been written to the database management hard disk 130. In one embodiment, the redistribution application 128 may verify that the control file 139 has been successfully written to the file system hard disk 132. This may be performed for each control file that is flushed to disk.

Assuming that at this point that the redistribution process has been interrupted and is now resuming, the redistribution application 128 on the receiving partition 104 then performs the following steps to undo changes associated with incomplete consistency points.

Referring still to FIG. 4, in step 406, in response to an interruption in the redistribution process, the redistribution application 128 identifies uncommitted pages and rows to be deleted in an undo operation based on the control files. More specifically, in one embodiment, the redistribution application 128 accesses and reads the lists from each of the control files stored on the file system hard disk.

The redistribution application 128 then identifies the committed pages and rows from each list that have been written to the database management hard disk 130. Because the control files containing the lists are flushed to disk after the associated pages and rows are flushed to disk, any of the pages and rows identified in the control files stored on the file system hard disk 132 are guaranteed to have been successfully flushed to disk. Also, as described above, in one embodiment, these control files are marked as complete before being flushed to disk.

In one embodiment, the redistribution application 128 then generates a sorted list of the committed pages and rows. These committed pages and rows are not to be deleted during an undo operation. More specifically, the redistribution application 128 iterates over all the completed control files to generate the sorted list of page-slot range pairs, where the sorted list includes entries from multiple lists of multiple completed consistency points. In one embodiment, the sorting key may be {page number, start slot}. As indicated above, the start slot is a first row appended to the page corresponding to the page number.

In one embodiment, the redistribution application 128 identifies the pages and rows to be deleted during an undo operation by iterating through the unflushed or uncommitted pages and the lists from the complete control files. If a given slot range of particular rows is not accounted for on the list, the redistribution application 128 renders the rows of the given slot range as being uncommitted and should be deleted from the page during an undo operation in order to allow a subsequent redo operation to occur. In other words, the redistribution application 128 deduces, from the sorted list, the pages and rows that contain uncommitted data, which are to be deleted. Because the redistribution application 128 examines control files marked as complete, the redistribution application 128 need not iterate over individual entries in the control files for uncommitted pages and rows.

Figure 5:
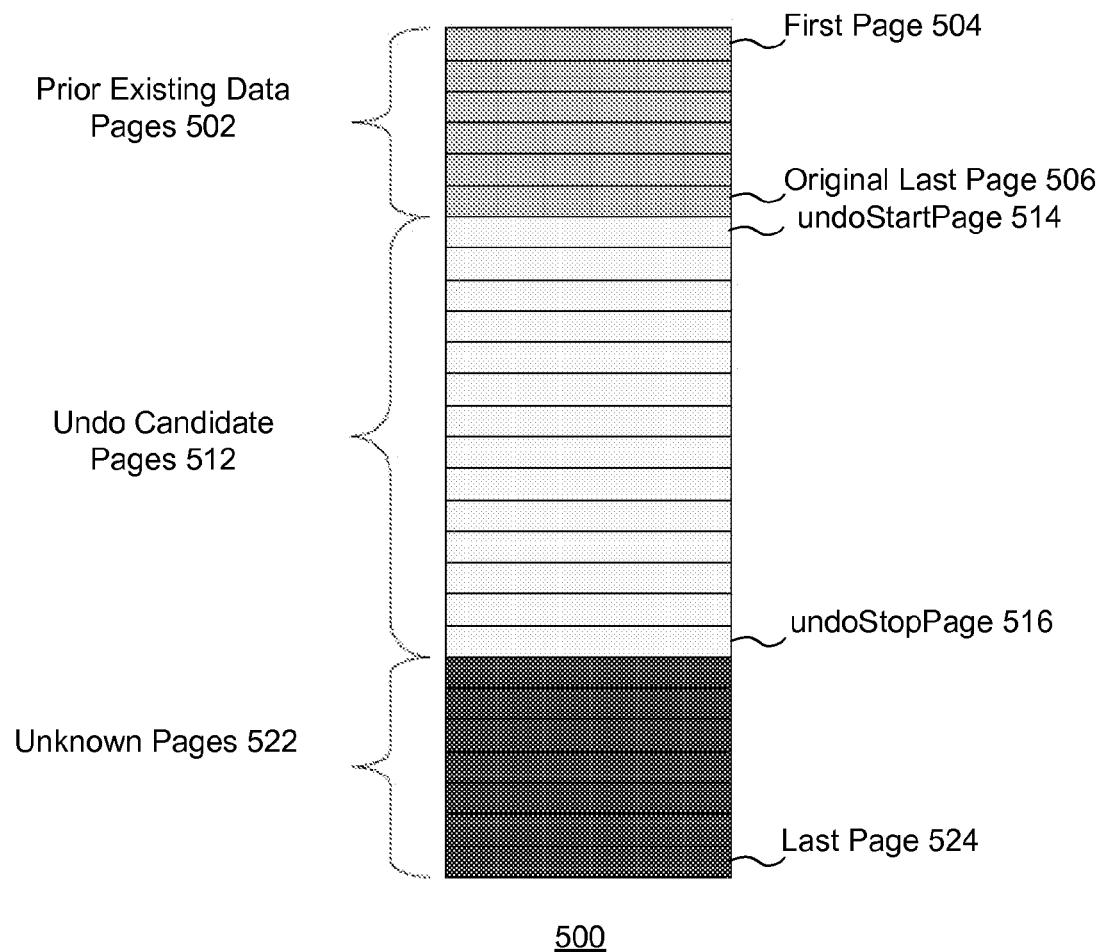
FIG. 5 is a diagram showing an example set of pages in accordance with one embodiment of the present invention.

FIG. 5 is a diagram showing an example set of pages 500 in accordance with one embodiment of the present invention. As FIG. 5 shows, the set of pages 500 includes prior existing data pages 502 that existed prior to the data redistribution process. In one embodiment, the prior existing data pages 502 include a first page 504 and an original last page 506.

The set of pages 500 also includes a range of pages in the complete control file to be considered for the undo operation. These pages may be also referred to as undo candidate pages 512. In one embodiment, the undo candidate pages 512 include the smallest page in the complete control file, where the smallest page may also be referred to as an undoStartPage 514. In one embodiment, the undoStartPage 514 may be the original last (logical) page 506 prior to the data redistribution process plus one page. The undoStartPage 514 is where the redistribution application 128 begins the undo operation.

The undo candidate pages 512 also include the largest page in the complete control file, where the largest page may also be referred to as an undoStopPage 516. The undoStopPage 516 is where the redistribution application 128 ends the undo operation. In one embodiment, some of the undo candidate pages 512 are committed, and some of the undo candidate pages 512 are not committed. In particular embodiments, the redistribution application 128 may delete or, alternatively, may ignore those pages that are not committed.

The set of pages 500 may also include unknown pages 522. In one embodiment, the unknown pages 522 include the first page following the undoStopPage 516 up to and including the last page 524 associated with the table. In an alternative embodiment, the unknown pages 522 may include any page that is not described as committed in the complete control file. In other words, some of the undo candidate pages 512 may also be considered unknown pages. In one embodiment, the redistribution application 128 performs the undo operation on only complete control files. Incomplete/partial control files are untrustworthy, because the data in partial control files may be corrupted or missing. In one embodiment, the redistribution application 128 may delete or, alternatively, may ignore all partial control files. Similarly, in one embodiment, the redistribution application 128 may delete or, alternatively, may ignore all of the unknown pages 522.

In a specific embodiment, during the iteration process, the redistribution application 128 identifies the smallest page (e.g., lowest logical page) of the complete control file and then identifies the largest page (e.g., largest logical page) of the complete control file. In one embodiment, to identify the smallest page, the redistribution application 128 reads meta information from the table and uses the page number of the last logical page 506 prior to the redistribute application 128 starting the undo operation. The redistribute application 128 then adds "1" to determine the smallest page (e.g., undoStartPage 514) in the range of undo candidate pages 512 to be considered for the undo operation. For example, if the last logical page to be flushed (e.g., original last page 506) is 3, the smallest page to consider for the undo operation would be page 3+1=page 4. As noted above, the smallest page may be referred to as "undoStartPage 514" but may alternatively be labeled with any other suitable name.

In one embodiment, the redistribution application 128 may assume that there can be existing data on the receiving partition 104 before initiating the redistribution process (e.g., drop-node scenarios). In one embodiment, a drop-node scenario is one where a node is removed and the data from the dropped node needs to be redistributed to other existing nodes. A result is that there is data in the table prior to the beginning of the redistribution process. In contrast, if a new node is added, the redistribution application 128 adds all of the data to that table. In other words, there was no data prior to the redistribution process. In an alternative embodiment, the redistribution application 128 may use the redistribution process to rebalance data when there is a skew in the nodes. Also, the redistribution application 128 may assume that these drop-node scenarios are a part of the existing data. As such, in one embodiment, the redistribution application 128 does not update the last logical page of the database table until either the redistribution process completes successfully or until a previous undo operation successfully completes.

In one embodiment, the highest page of the complete control file is simply the page with the highest logical page number contained in the receiving partition 104. In one embodiment, the highest page may be referred to as the undoStopPage 516, but may be any other suitable name. Clearly, all pages after undoStopPage 516 cannot contain any committed data. As such, the redistribution application 128 does not consider such pages for the undo operation. The redistribution application 128 simply truncates these pages off of the end of the database table at the end of the undo operation.

In one embodiment, the redistribution application 128 iterates over all pages in the range [undoStartPage, undoStopPage]. If a given page is found to be in the sorted list, the redistribution application 128 renders any rows appended to that page that are not accounted for in the sorted list as uncommitted. Those rows are deleted from that page and deleted in an undo operation. Any page that is not in the sorted list at all is to be deleted entirely.

The redistribution application 128 then updates the meta information for the database table to indicate that the last logical page of the database table is undoStopPage 514. Once the redistribution application 128 flushes the meta information to disk, the redistribution application 128 truncates the database table such that all pages above undoStopPage 516 are removed from the table. In one embodiment, the redistribution can then remove all the unflushed control files. As indicated above, in one embodiment, the redistribution application 128 does not update the last logical page of the database table until either the redistribution process completes successfully or until a previous undo operation successfully completes.

According to the system and method disclosed herein, the present invention provides numerous benefits. For example, embodiments of the present invention minimize flushing of control files at run time. Embodiments of the present invention also increase overall redistribution performance while maintaining all the benefits of minimal logging. Because the page-slot range entries contain only page numbers and slot ranges, the entries require a minimal amount of storage space in the control file. This minimal amount of data enables the receiving partition 104 to efficiently undo uncommitted data, because the receiving partition 104 processes less data.

A method and system in accordance with the present invention for facilitating an undo operation has been disclosed. In one embodiment, the method includes generating a control files for batches of data being received from a sending partition during a redistribution operation. The method also includes writing the control files to a persistent memory for each control file, where all of the associated rows of the respective consistency point have been appended to pages and written to a persistent memory. In response to an interruption in the redistribution process, the method further includes identifying pages and rows to be deleted during an undo operation based on the plurality of control files.

The present invention has been described in accordance with the embodiments shown. One of ordinary skill in the art will readily recognize that there could be variations to the embodiments, and that any variations would be within the spirit and scope of the present invention. For example, the present invention can be implemented using hardware, software, a computer readable medium containing program instructions, or a combination thereof. Software written according to the present invention is to be either stored in some form of computer-readable storage medium such as memory or CD-ROM, or is to be transmitted over a network, and is to be executed by a processor. Consequently, a computer-readable medium may include a computer readable signal, which may be, for example, transmitted over a network. Data resulting from embodiments of the present invention may be stored in a computer-readable storage medium, transmitted over a network, and may be displayed to a user. Accordingly, many modifications may be made by one of ordinary skill in the art without departing from the spirit and scope of the appended claims.

What is claimed is:

1. A method for facilitating an undo operation in a redistribution process, the method comprising:

receiving, at a receiving partition, data to be redistributed in the redistribution process that is grouped into a plurality of consistency points by a sending partition, wherein each of the consistency points comprises at least one page that includes appended rows of the data to be redistributed and comprises control information, and wherein the at least one page for each of the plurality of consistency points is stored in cache at the sending partition;

generating, at the receiving partition, a plurality of control files, wherein each control file is associated with one of the plurality of consistency points, wherein the control file identifies a range of appended rows for the at least one page;

storing, at the receiving partition, the at least one page for a consistency point of the plurality of consistency points in persistent memory at the receiving partition;

marking, at the receiving partition, the control file for the consistency point as complete to identify the at least one page as committed;

sending, from the receiving partition, a notification to the sending partition, wherein the at least one page for the consistency point is moved from cache to persistent memory at the sending partition in response to the notification; and in response to an interruption in the redistribution process, performing an undo operation on the receiving partition for any appended rows of pages that are not written to persistent memory using the control file marked as complete, wherein the redistribution process is restarted on the sending partition, and wherein performing the undo operation comprises:
- reading the at least one page stored in the persistent memory;
- identifying the at least one page and rows in the at least one page as committed; and
- generating a sorted list of the committed at least one page and rows, wherein the committed at least one page and rows are not to be deleted during the undo operation, wherein the sorted list is generated using a sorting key that includes a page number and a start slot, and wherein the start slot is a first row appended to the page corresponding to the page number.

2. The method of claim 1 wherein rows that are not accounted for on the at least one page are rendered as being uncommitted and are to be deleted during the undo operation.

3. The method of claim 1 further comprising marking each control file as complete after writing associated pages and rows to the persistent memory.

4. The method of claim 1 further comprising verifying that at least one control file has been successfully written to the persistent memory.

5. The method of claim 1 further comprising identifying a lowest page of an incomplete control file and a highest page of the incomplete control file.

6. A system for facilitating an undo operation in redistribution process, comprising:
- a processor; and
- a memory device coupled to the processor, said memory device storing an application which, when executed by the processor, causes the processor to:
  - receive, at a receiving partition, data to be redistributed in the redistribution process that is grouped into a plurality of consistency points by a sending partition, wherein each of the consistency points comprises at least one page that includes appended rows of the data to be redistributed and comprises control information, and wherein the at least one page for each of the plurality of consistency points is stored it cache at the sending partition;
  - generate, at the receiving partition, a plurality of control files, wherein each control file is associated with one of the plurality of consistency points, wherein the control file identifies a range of appended rows for the at least one page;
  - store, at the receiving partition, the at least one page for a consistency point of the plurality of consistency points in persistent memory at the receiving partition;
  - mark, at the receiving partition, the control file for the consistency point as complete to identify the at least one page as committed;
  - send, from the receiving partition, a notification to the sending partition, wherein the at least one page for the consistency point is moved from cache to persistent memory at the sending partition in response to the notification; and
  - in response to an interruption in the redistribution process, perform the undo operation on the receiving partition for any appended rows of pages that are not written to persistent memory using the control file marked as complete, wherein the redistribution process is restarted on the sending partition, and wherein performing the undo operation comprises:
    - reading the at least one page stored in the persistent memory;
    - identifying the at least one page and rows in the at least one page as committed; and
    - generating a sorted list of the committed at least one page and rows, wherein the committed at least one page and rows are not to be deleted during the undo operation, wherein the sorted list is generated using a sorting key that includes a page number and a start slot, and wherein the start slot is a first row appended to the page corresponding to the page number.

7. The system of claim 6 wherein rows that are not accounted for on the at least one page are rendered as being uncommitted and are to be deleted during the undo operation.

8. The system of claim 6 wherein the application is further operable to cause the processor to mark each control file as complete after writing associated pages and rows to the persistent memory.

9. The system of claim 6 wherein the application is further operable to cause the processor to verify that at least one control file has been successfully written to the persistent memory.

10. The system of claim 6 wherein the application is further operable to cause the processor to identify a lowest page of an incomplete control file and a highest page of the incomplete control file.

11. A computer program product for use in a computer for facilitating an undo operation in a redistribution process, the computer program product comprising a non-transitory computer-usable storage medium tangibly embodying computer readable program code, the computer program product comprising:
- code for receiving, at a receiving partition, data to be redistributed in the redistribution process that is grouped into a plurality of consistency points by a sending partition, wherein each of the consistency points comprises at least one page that includes appended rows of the data to be redistributed and comprises control information, and wherein the at least one page for each of the plurality of consistency points is stored in cache at the sending partition;
- code for generating, at the receiving partition, a plurality of control files, wherein each control file is associated with one of the plurality of consistency points, wherein the control file identifies a range of appended rows for the at least one page;
- code for storing, at the receiving partition, the at least one page for a consistency point of the plurality of consistency points in persistent memory at the receiving partition;
- code for marking, at the receiving partition, the control file for the consistency point as complete to identify the at least one page as committed;
- code for sending, from the receiving partition, a notification to the sending partition, wherein the at least one page for the consistency point is moved from cache to persistent memory at the sending partition in response to the notification; and
- in response to an interruption in the redistribution process, code for performing the undo operation on the receiving partition for any appended rows of pages that are not written to persistent memory using the control file marked as complete, wherein the redistribution process is restarted on the sending partition, and wherein the code for performing the undo operation comprises:

code for reading the at least one page stored in the persistent memory;

code for identifying the at least one page and rows in the at least one page as committed; and code for generating a sorted list of the committed at least one page and rows, wherein the committed at least one page and rows are not to be deleted during the undo operation, wherein the sorted list is generated using a sorting key that includes a page number and a start slot, and wherein the start slot is a first row appended to the page corresponding to the page number.

12. The computer program product of claim 11 wherein rows that are not accounted for on the at least one page are rendered as being uncommitted and are to be deleted during the undo operation.

13. The computer program product of claim 11 further comprising code for marking each control file as complete after writing associated pages and rows to the persistent memory.

14. The computer program product of claim 11 further comprising code for verifying that at least one control file has been successfully written to the persistent memory.

15. The computer program product of claim 11 further comprising code for identifying a lowest page of an incomplete control file and a highest page of the incomplete control file.

* * * * *